(12) United States Patent
Lee

(10) Patent No.: US 8,334,018 B2
(45) Date of Patent: Dec. 18, 2012

(54) METHOD OF PREPARING A GREEN-CERAMIC PIGMENT FOR REDUCTION FIRING USING COPPER OXIDE AND A GREEN CERAMIC MADE THEREBY

(75) Inventor: Byung-Ha Lee, Seoul (KR)

(73) Assignee: Myongji University Industry and Academia Cooperation Foundation, Gyeonggi-do (KR)

( * ) Notice: Subject to any disclaimer, the term of this patent is extended or adjusted under 35 U.S.C. 154(b) by 826 days.

(21) Appl. No.: 12/456,789

(22) Filed: Jun. 23, 2009

(65) Prior Publication Data

US 2010/0304031 A1 Dec. 2, 2010

(30) Foreign Application Priority Data

May 27, 2009 (KR) .......................... 10-2009-0046558

(51) Int. Cl.
*B05B 3/02* (2006.01)
*B29C 69/00* (2006.01)
*C04B 35/64* (2006.01)

(52) U.S. Cl. ...................... 427/376.2; 264/140; 264/678
(58) Field of Classification Search ............... 427/376.2; 264/140, 678

See application file for complete search history.

(56) References Cited

U.S. PATENT DOCUMENTS

2002/0022133 A1* 2/2002 Hayashi et al. ............... 428/432

* cited by examiner

*Primary Examiner* — Leo B Tentoni
(74) *Attorney, Agent, or Firm* — Brian R. Morrison; Westman, Champlin & Kelly, P.A.

(57) ABSTRACT

A method of preparing a green-ceramic pigment for reduction firing using copper oxide that includes mixing tin oxide ($SnO_2$) and copper oxide (CuO); providing a fired product by applying oxidation firing to the mixture at a firing temperature of 1000 to 1300° C.; and grinding the fired product. Aspects also provide a green-ceramic pigment prepared by this method, as well as a method of manufacturing a green ceramic.

6 Claims, 3 Drawing Sheets
(2 of 3 Drawing Sheet(s) Filed in Color)

METHOD OF PREPARING A GREEN-CERAMIC PIGMENT FOR REDUCTION FIRING USING COPPER OXIDE AND A GREEN CERAMIC MADE THEREBY

CROSS-REFERENCE TO RELATED APPLICATION

This application claims the benefit of Korean Patent Application No. 10-2009-0046558, filed with the Korean Intellectual Property Office on May 27, 2009, the disclosure of which is incorporated herein by reference in its entirety.

BACKGROUND

1. Technical Field

The present invention relates to a green-ceramic pigment using copper oxide for applications involving reduction firing, as well as to a method of preparing the green-ceramic pigment and a green ceramic made using the green-ceramic pigment. More particularly, the present invention relates to a method of preparing a pigment intended for reduction firing that exhibits a green color, when the pigment is mixed with glaze, applied to a ceramic, and subject to reduction firing at a temperature of 1000 to 1300° C., as well as to a green ceramic made by this method.

2. Description of the Related Art

Typically, a thin layer of glaze, which is made from a vitreous powder, is applied to the surface of a ceramic. The glazing may increase the strength of the ceramic, reduce absorption for convenient usage, and provide resistance to alkalis and acids. Also, the surface of the ceramic can be made smooth and clean, making it easier to clean. As such, most industrial ceramics generally utilize glazing.

The color of a ceramic using glazing may be obtained by thermally treating metal oxides in a kiln. Glazes used at a firing temperature of 1000° C. or lower can provide a greater variety of rich colors, but glazes used at about 1300° C. or more, the variety of color formation may be limited.

A pigment used for forming a color in a ceramic is typically used after mixing with a solvent and a fireproofing agent, and is fired at a high temperature to form the desired color. The color of the pigment may vary according to the type of material mixed in, and there are also instances in which the color is changed by the firing temperature or the firing atmosphere.

When preparing a glaze for a ceramic, copper oxide (CuO) can be added to the glaze in a proportion of 5 weight % or less (with respect to the total weight of the glaze and copper oxide). The glaze can be applied to an unfired ceramic, after which firing the ceramic in a reducing atmosphere may provide a reddish color, whereas firing the ceramic in an oxidizing atmosphere may provide a bluish to greenish color, or strictly speaking, a jade color. In the related art, it was hitherto very difficult to implement a green color when firing a ceramic in a reducing atmosphere after applying the glaze with copper oxide mixed in.

Thus, the inventor has continued research in methods of implementing a green color in ceramics using copper oxide made by reduction firing at a high temperature of 1000° C. or higher.

SUMMARY

One aspect of the invention is to provide a method of preparing a pigment that exhibits a green color when the ceramic to which it is applied is produced by reduction firing, by mixing copper oxide (CuO) with tin oxide ($SnO_2$) and subjecting the mixture to oxidation firing so that a solid solution of copper oxide in tin oxide is obtained.

Another aspect of the invention is to provide a green-ceramic pigment prepared by the above method.

Also, another aspect of the invention is to provide a method of manufacturing a green ceramic using the above green pigment.

An aspect of the invention provides a method of preparing a green-ceramic pigment for reduction firing using copper oxide, where the method includes: mixing tin oxide ($SnO_2$) and copper oxide (CuO); providing a fired product by applying oxidation firing to the mixture at a firing temperature of 1000 to 1300° C.; and grinding the fired product.

In an embodiment of the invention, the operation of mixing the tin oxide and the copper oxide can include mixing 1 to 10 parts by weight of the copper oxide per 100 parts by weight of the tin oxide.

In an embodiment of the invention, the duration of the oxidation firing can be within a range of 30 minutes to 3 hours.

Another aspect of the invention provides a green-ceramic pigment intended for reduction firing prepared according to the method described above.

Yet another aspect of the invention provides a method of manufacturing a green ceramic, where the method includes: mixing tin oxide ($SnO_2$) and copper oxide (CuO); providing a fired product by applying oxidation firing to the mixture at a firing temperature of 1000 to 1300° C.; grinding the fired product; mixing the ground fired product with glaze; and applying the glaze mixture to a ceramic and subjecting the ceramic to reduction firing.

Additional aspects and advantages of the present invention will be set forth in part in the description which follows, and in part will be obvious from the description, or may be learned by practice of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
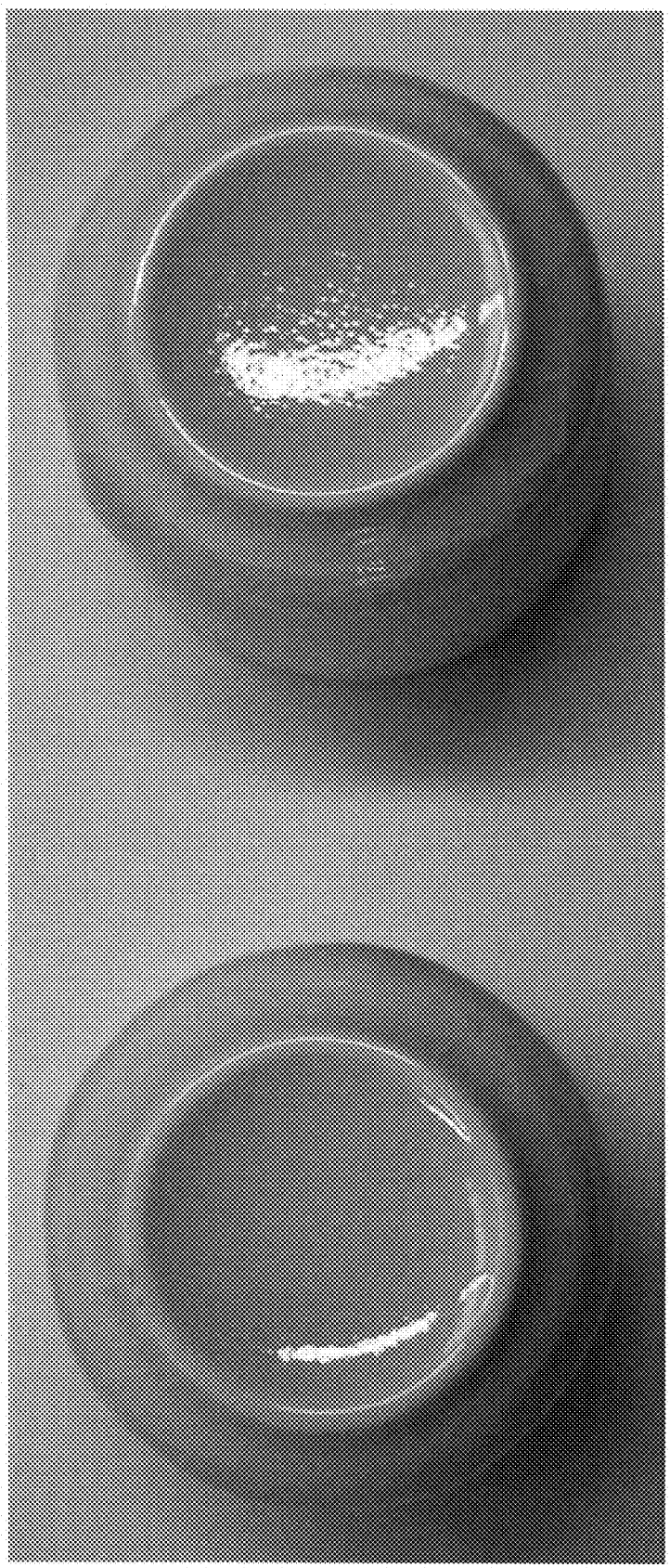
FIG. 1 is a photograph of ceramics manufactured according to Example 1 of the present invention.

An aspect of the present invention can include mixing tin oxide ($SnO_2$) and copper oxide (CuO); providing a fired product by applying oxidation firing to the mixture at a firing temperature of 1000 to 1300° C.; and grinding the fired product.

Certain embodiments of the invention will be described below in more detail.

First, tin oxide ($SnO_2$) and copper oxide (CuO) may be mixed together, in order to form a solid solution of copper oxide in tin oxide. Tin oxide and copper oxide are compounds well known in the related field of art, and any of the various commercially available products can be used.

The mixture can include 1 to 10 parts by weight of copper oxide per 100 parts by weight of the tin oxide. If the content of copper oxide is less than 1 part by weight, the volatilization of the copper oxide can result in an extremely small amount of copper oxide in the solid solution, so that when the mixture is added to the glaze, proper color formation may not be achieved. On the other hand, if the content of copper oxide is more than 10 parts by weight, there may be copper oxide left over that does not form a solid solution in the tin oxide, so that when the mixture is added to the glaze, a reddish color may be formed.

The tin oxide and copper oxide mixture may undergo a firing operation to form a fired product. A desirable firing temperature may be from 1000 to 1300° C., as a temperature outside this range may make it difficult for the copper oxide to form a solid solution in the tin oxide.

The firing can be performed in an oxidizing atmosphere. Oxidation firing is a firing method in which a sufficient amount of oxygen is provided in the kiln, etc., to achieve complete combustion, so that the resulting combustion gas is $CO_2$.

In general, when reduction firing is performed after directly adding copper oxide to the ceramic glaze and applying the glaze mixture to the bisque fire ceramic, a red color may be provided because of $Cu_2O$. However, when reduction firing is performed for a ceramic applied with a glaze mixture in which a solid solution of copper oxide in tin oxide is added as a pigment, according to an aspect of the invention, the surface of the ceramic may provide a green color.

A desirable duration for maintaining the firing temperature can be 30 minutes to 3 hours. If the duration is less than 30 minutes, it may be difficult to obtain a solid solution. However, a duration of more than 3 hours may not provide a significant difference, after the solid solution of copper oxide in tin oxide is complete.

In order to utilize the fired product as a pigment for ceramics, the fired product may be ground into fine powder. The grinding of the fired product, according to an aspect of the invention, can be performed using any of the variety of tools known to the related field of art, such as a mortar, etc. The ground fired product may be mixed in the glaze for a ceramic, to function as a pigment that provides a color after the subsequent firing operation. Here, the fired product can be ground to a size of 7 to 13 μm, which is a typical range of sizes for pigment grounds used in ceramics.

When the ceramic pigment prepared by the method above is added to a glaze and applied to a ceramic, a reduction firing procedure applied to the ceramic may form a uniform, green color.

In a more detailed example, a green ceramic can be manufactured by mixing tin oxide ($SnO_2$) and copper oxide (CuO); providing a fired product by applying oxidation firing to the mixture at a firing temperature of 1000 to 1300° C.; grinding the fired product; mixing the ground fired product with glaze; and applying the glaze mixture to a ceramic and subjecting the ceramic to reduction firing.

The glaze can be any glaze intended for ceramics known to the art. Examples may include, but are not limited to, lime glaze, lime-barium glaze, and magnesia glaze.

The ground fired product can be mixed in 1 to 10 weight %, while the glaze can be mixed in 99 to 90 weight %. This may be an optimal combination for green color formation, but the mixing proportion is not strictly limited to this range. However, if the content of the fired product is lower than 1 weight %, the effect of green color formation may be insignificant, whereas if the content is higher than 10 weight %, the excess amounts of copper oxide included in the glaze may change into a blackish color.

The reduction firing can be performed at 1000 to 1300° C. Conventional methods, which include adding copper oxide directly to the glaze for reduction firing, may not provide a greenish color with this temperature range. On the contrary, if a pigment prepared by a method of dissolving copper oxide in tin oxide as a solid solution is added to the glaze and applied to the surface of a ceramic, according to an aspect of the invention, the ceramic can be made to exhibit a green color, even when reduction firing is performed at the temperature range of 1000 to 1300° C.

If the firing temperature is outside the range described above, the effect of green color formation may not be obtained to the desired level.

Aspects of the present invention will be described below in more detail with reference to certain examples. The examples are for illustrative purposes only and do not limit the scope of the invention.

EXAMPLES

Example 1

3 parts by weight of copper oxide (Junsei, Japan) were mixed in 100 parts by weight of tin oxide (Junsei, Japan), and the mixture was subjected to 2 hours of oxidation firing at 1300° C., so that the copper oxide was dissolved in the tin oxide as a solid solution. The fired product was placed in a mortar and finely ground, to obtain a pigment of which the sizes of the grounds were about 7 to 13 μm.

Example 2

2 weight % of the pigment obtained in Example 1 and 98 weight % of lime glaze were mixed together and applied to ceramic samples, after which the samples were subjected to reduction firing at 1240° C. As a result, the ceramic samples displayed a green color, as shown in FIG. 1.

Figure 2:
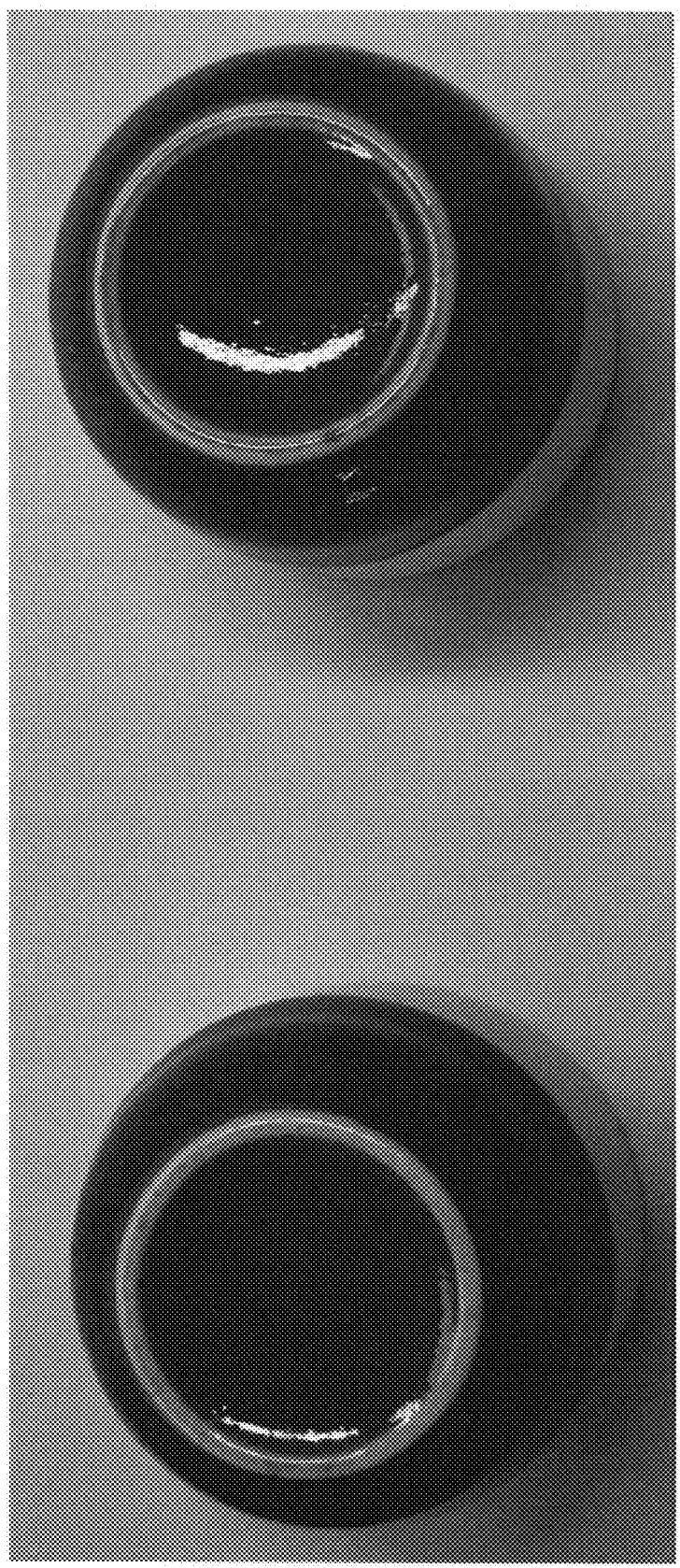
FIG. 2 is a photograph of ceramics manufactured according to the Comparative Example.

Comparative Example 4 weight % of copper oxide (Junsei, Japan) and 95 weight % of lime glaze were mixed together and applied to ceramic samples, after which the samples were subjected to reduction firing at 1240° C. As a result, the ceramic samples displayed a red color, as shown in FIG. 2.

Test Example

Color Analysis

Figure 3:
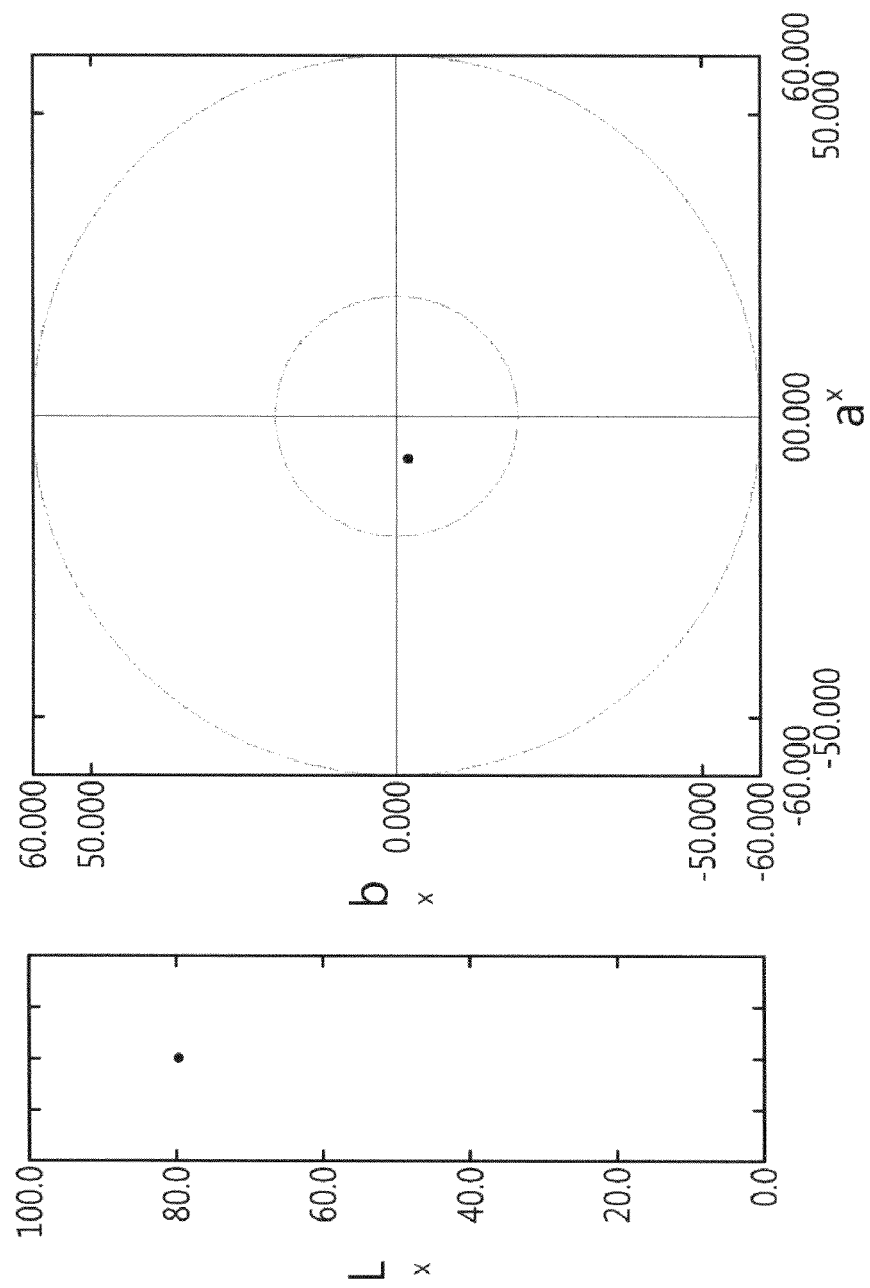
FIG. 3 represents the results of UV analysis for a pigment prepared according to Example 1 of the present invention.

The color of the pigment obtained in Example 1 was analyzed using a UV-visible spectrophotometer (UV-2401PC, Shimadzu, Japan) based on the CEE (Commission Internationale de l'Eclairage) color scale (L*, a*, b*). The results are represented in FIG. 3. As shown in FIG. 3, a pigment according to an aspect of the invention provided a lightness value L* of 79.56, and color values of a*: −6.9 and b*: −1.95. Thus, it is observed that a natural green color was obtained.

As noted from the above examples and test example, a green-ceramic pigment can be obtained by mixing copper oxide with tin oxide and applying oxidation firing. Also, a ceramic having a green color can be obtained by mixing this green pigment with glaze, applying the glaze mixture to a ceramic, and subjecting the ceramic to reduction firing.

As set forth above, a green-ceramic pigment for reduction firing that uses copper oxide, according to certain aspects of the invention, can be mixed with glaze, applied to a ceramic, and subjected to reduction firing, to form a green color on the surface of the ceramic.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:

1. A method of preparing a green-ceramic pigment using copper oxide for reduction firing, the method comprising:
   mixing tin oxide ($SnO_2$) and copper oxide (CuO);
   providing a fired product by applying oxidation firing to the mixture at a firing temperature of 1000 to 1300° C.; and
   grinding the fired product.

2. The method of claim 1, wherein the mixing of the tin oxide and the copper oxide includes mixing 1 to 10 parts by weight of the copper oxide per 100 parts by weight of the tin oxide.

3. The method of claim 1, wherein the oxidation firing is performed for a duration of 30 minutes to 3 hours.

4. A method of manufacturing a green ceramic, the method comprising:
   mixing tin oxide ($SnO_2$) and copper oxide (CuO);
   providing a fired product by applying oxidation firing to the mixture at a firing temperature of 1000 to 1300° C.;
   grinding the fired product;
   mixing the ground fired product with glaze; and
   applying the glaze mixture to a ceramic and subjecting the ceramic to reduction firing.

5. The method of claim 4, wherein the mixing of the ground fired product and the glaze includes mixing 1 to 10 weight % of the ground fired and 99 to 90 weight % of the glaze.

6. The method of claim 4, wherein the reduction firing is performed at 1000 to 1300° C.

* * * * *